United States Patent
Gullov-Rasmussen

(10) Patent No.: US 8,070,865 B2
(45) Date of Patent: Dec. 6, 2011

(54) VACUUM VESSEL FOR TREATMENT OF OILS

(75) Inventor: Bjarne Gullov-Rasmussen, Hvidovre (DK)

(73) Assignee: Alfa Laval Corporate AB (SE)

( * ) Notice: Subject to any disclaimer, the term of this patent is extended or adjusted under 35 U.S.C. 154(b) by 834 days.

(21) Appl. No.: 11/912,527

(22) PCT Filed: Apr. 26, 2006

(86) PCT No.: PCT/SE2006/000502
§ 371 (c)(1),
(2), (4) Date: Mar. 31, 2008

(87) PCT Pub. No.: WO2006/118517
PCT Pub. Date: Nov. 9, 2006

(65) Prior Publication Data
US 2008/0187473 A1    Aug. 7, 2008

(30) Foreign Application Priority Data

Apr. 29, 2005  (SE) ..................................... 0501008

(51) Int. Cl.
*B01D 19/00* (2006.01)
(52) U.S. Cl. .............. 96/199; 96/201; 95/246; 426/488; 210/180
(58) Field of Classification Search ..................... 96/201
See application file for complete search history.

(56) References Cited

U.S. PATENT DOCUMENTS

| 3,999,966 A | 12/1976 | Naylor |
| 4,089,880 A | 5/1978 | Sullivan |
| 5,628,901 A * | 5/1997 | Lawrence et al. ............. 210/251 |

FOREIGN PATENT DOCUMENTS

| GB | 505810 A | 5/1939 |
| GB | 704232 A | 2/1954 |
| WO | WO 8604603 A1 | 8/1986 |
| WO | WO 9533809 A1 | 12/1995 |

* cited by examiner

*Primary Examiner* — Duane Smith
*Assistant Examiner* — Douglas J. Theisen
(74) *Attorney, Agent, or Firm* — Michaud-Kinney Group LLP

(57) ABSTRACT

A vacuum vessel for continuous or semi-continuous treatment of oils in connection with deodorization comprises spaces ($12$, $12^1$, $12^2$) through which oil to be treated is brought to pass and means to heat or cool the oil in the form of U-tubes. There are perforated pipes (26) arranged at the bottom of said spaces to lead stripping gas into said oil. The vessel has a connection to a vacuum source (7). The spaces in the vessel are arranged such that the oil to be treated in the vessel flows through the same by gravity. The heating or cooling medium passing the U-tubes is arranged to be pumped therethrough. The U-tubes for heating or cooling medium are arranged in such a way in said spaces that the flow of oil is counter-current to the flow of heating or cooling medium all through the vessel and a number of U-tubes are arranged in groups (13), parallel and in rows above each other in said spaces.

10 Claims, 5 Drawing Sheets

VACUUM VESSEL FOR TREATMENT OF OILS

FIELD OF THE INVENTION

The present invention relates to a vacuum vessel for continuous or semi-continuous treatment of oils in connection with deodorization, which vessel comprises spaces through which the oil to be treated is brought to pass, means to heat or cool the oil in the form of U-tubes, perforated pipes arranged at the bottom of said spaces to lead stripping gas into said oil, which vessel has a connection to a vacuum source and which spaces in the vessel are arranged such that the oil passes through the vessel by gravity and a heating or cooling medium passing said U-tubes is arranged to be pumped therethrough.

BACKGROUND OF THE INVENTION

Such a vacuum vessel for treatment of fatty oils is described for example in EP 0 763 082 B1. When producing consumer products as edible oils out of different vegetable or animal oils deodorization is a part of the refining process. During the deodorization the oil is heated to a high temperature 180-275° C. in order to remove contaminants and unwanted substances from the oil. These substances have a lower boiling point than the different triglycerides, which constitute the edible oil. The deodorization is carried through under vacuum 1-20 mbar and the removal of the volatiles is facilitated by adding stripping gas to the oil. The stripping gas may consist of an inert gas or steam. The stripping gas ensures agitation of the oil and promotes heat transfer and makes the removal of the unwanted substances easier.

Vacuum vessels may be used for treatment of many kinds of oils and fats including mineral oil.

For many types of oils it is useful to heat the oil under vacuum with addition of stripping gas during a pretreatment step prior to the deodorization in order to remove the dissolved air and that hinder an oxidation of the oil.

The deodorized oil is also in many cases subjected to a further treatment with injection of stripping gas during a simultaneous cooling after the deodorization step.

The vessel is specially adapted for exchanging heat between incoming and outgoing edible oils in deodorizing and physical refining plants. The incoming oil to the deodorizing column is heated by outgoing oil under vacuum and sparging conditions The aim of the invention is to increase the efficiency of the heat exchange between the oil and the heating or cooling medium while limiting the size of the vacuum vessel. This is achieved in that the U-tubes for heating or cooling medium are arranged in such a way in said spaces that the flow of oil is counter-current to the flow of heating or cooling medium all through the vessel and that a number of U-tubes are arranged in groups, parallel and in rows above each other.

SUMMARY OF THE INVENTION

The vacuum vessel according to the invention may with advantage comprise at least one layer of spaces for the oil to be treated in the vessel. According to a preferred embodiment of the vacuum vessel according to the invention there are two layers of spaces for oil. There is an inlet for the oil to an upper part of the upper layer and an outlet for the oil in a lower part of the lower layer. There is also a channel connecting a lower part of the upper layer to a higher part of the lower layer. This channel may advantageously be situated on the outside of the vacuum vessel. If so is suitable the vessel may contain three or more layers of spaces.

The lower part of the vessel has preferably a square-shaped or rectangular form while the upper part of the vessel is curved (bended).

In the vessel there are with advantage channel plates separating the spaces for oil from each other in order to create a long path for the oil through the vessel. The channel plates are firmly connected to two sides of the vessel facing each other and are provided with an opening in one end to provide a connection to another space for the oil. The opening is provided in an end firmly connected to a first side of the vessel. It is possible to let the channel plates end at a distance from one of the sides but when the channel plates are firmly connected to both sides the stability of the vessel increases.

Between the channel plates there are walls firmly connected to said first side of the vessel and ending at a distance from the a second side. These walls are situated between the legs of the U-tubes. This arrangement of the walls in relation to the channel plates make it possible to obtain a counter-current flow of the oil in relation to the heating or cooling medium. Of course it is possible to obtain the desirable counter-current flow in some other ways within the scope of the invention.

On the outside of the first side of vacuum vessel there are headers, which define inlets to distribute the heating or cooling medium into the U-tubes and outlets to collect the heating or cooling medium after passage of the U-tubes. By arranging different headers for the inlet and outlet to each group of U-tubes it is easier to seal each header due to the smaller covers. The smaller covers mean that there is less critical machining for the gasket surface, lower risk of warp and a better choice of gasket material. This is important for preventing leakage of oil during operation, but also for preventing entry of air during stock-change.

The second and third headers are connected as well as the fourth and fifth header and so on, counted from the inlet for the heating or cooling medium. In this way the heating or cooling medium is made to flow through the U-tubes in all spaces in the vessel.

The number of U-tubes in each space for oil depends on the desired capacity of the vacuum vessel.

The walls between the channel plates in the upper layer of spaces are suitably hollow in order to create a connection between a volume above the oil in the lower layer and a volume above the oil in the upper layer of spaces, which upper volume is connected to the vacuum source.

The vacuum vessel according to the invention is preferable made up by thin elements, baffles and channel plates, which are arranged in such relation to each other that the structure of the vessel is self-supporting.

The vacuum vessel according to the invention may be used for preheating fatty oils to be deodorized by already deodorized oil and subjecting said deodorized oil to a further treatment with stripping gas.

BRIEF DESCRIPTION OF THE DRAWINGS

A preferred embodiment of a vacuum vessel according to the invention is described in more detail with reference to the attached drawings.

DETAILED DESCRIPTION OF THE PREFERRED EMBODIMENTS

Figure 1:
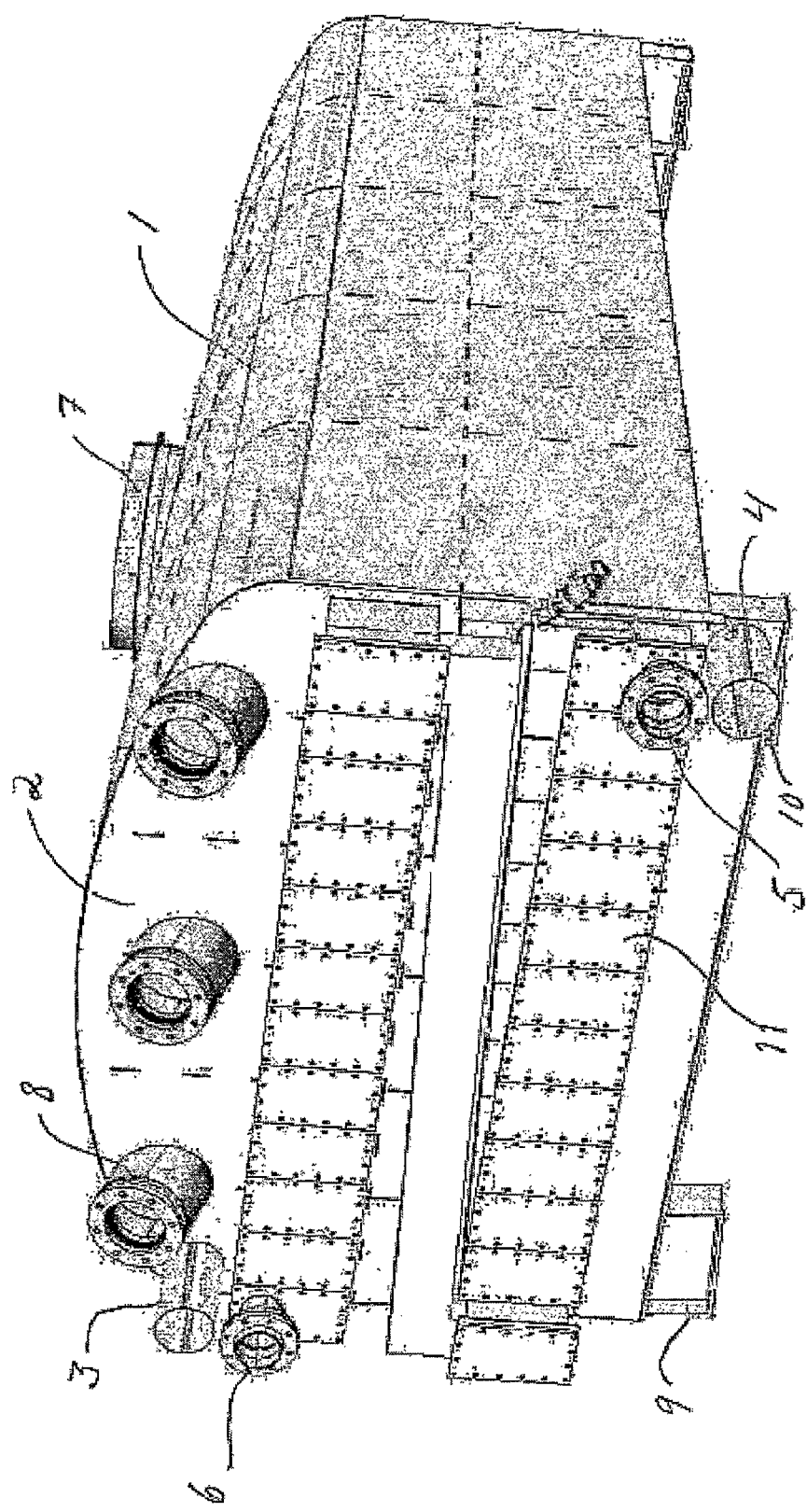
FIG. 1 shows a perspective drawing of the vacuum vessel.

The embodiment of the vacuum vessel 1 shown in FIG. 1 has an elongated form with a first side 2. There is an inlet 3 for the oil, which is to be treated in the vessel in an upper corner of the side 2 and an outlet 4 for the treated oil in a lower corner. There are also an inlet 5 and an outlet 6 for a heating or cooling medium. At the top of the vessel 1 there is a connection 7 to a vacuum source. There are also three sight-glasses 8. As may be seen in the drawing there is a leg 9 in the left end of side 2 which is higher than the leg 10 at the right end. This arrangement results in that the bottom of the vessel is inclined in relation to the foundation. There are also headers 11 for distributing the heating or cooling medium over the group of U-tubes.

At the other end of the vessel (not shown in the drawing) there are sparging pipes for stripping steam and further sight-glasses for a lower layer or deck.

Figure 2:
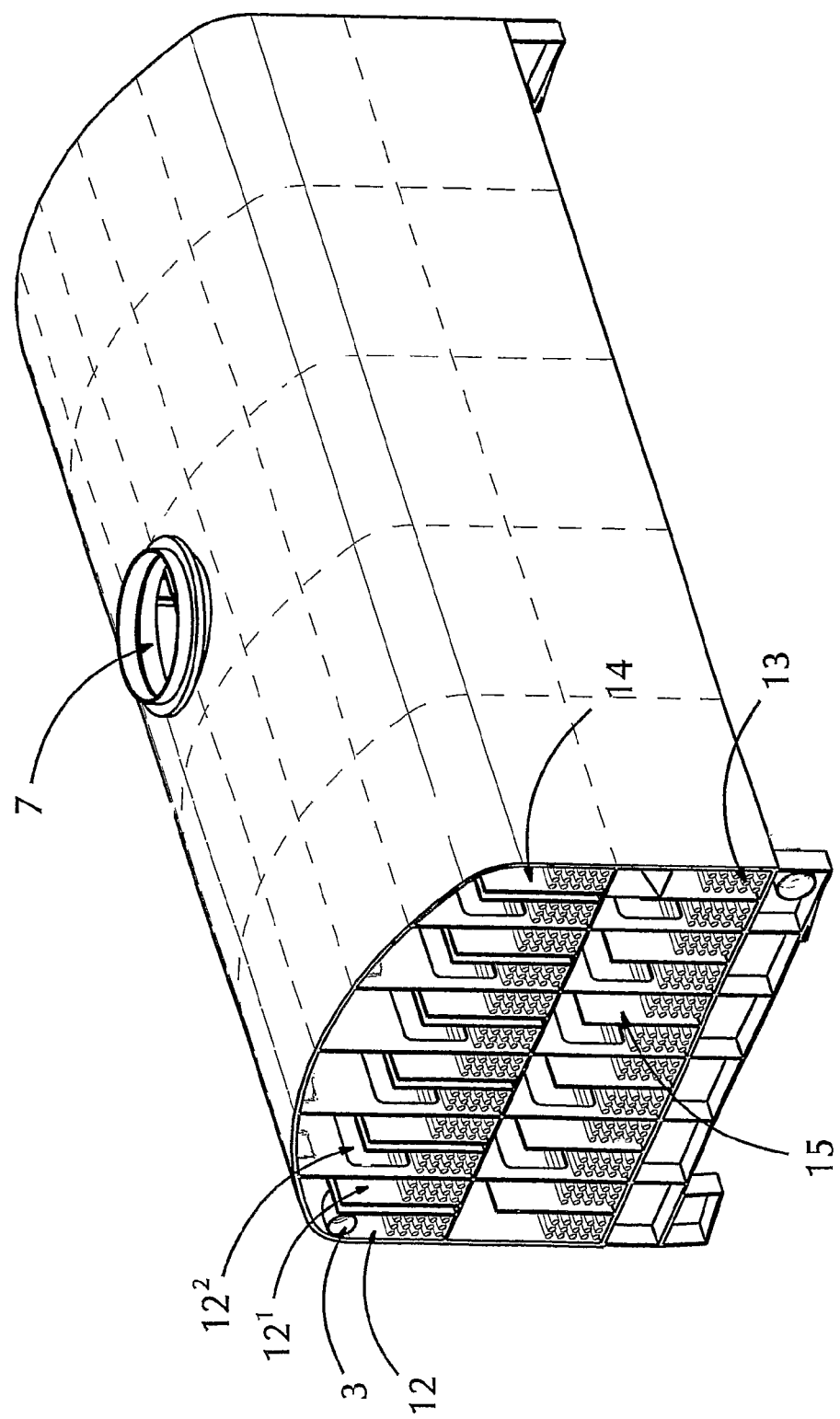
FIG. 2 shows a perspective drawing of the vacuum vessel as seen from a point of view, where the front side has been removed.

In FIG. 2 there is shown the spaces 12, $12^1$ through which the oil to be treated flows as well as the inlet 3 for the oil. The oil enters the vessel by way of the inlet 3, flows along the long-side of the vessel and returns through space $12^1$ to the first side 2 of the vessel. The oil is then directed to the next space $12^2$ through the opening visible in the channel plate between 12 and $12^1$ and flows again to the other side of the vessel. In each space for the oil there are legs of a group of U-tubes 13 for heating or cooling the oil to be treated. The spaces for oil are arranged in two layers or decks 14 and 15.

Figure 3:
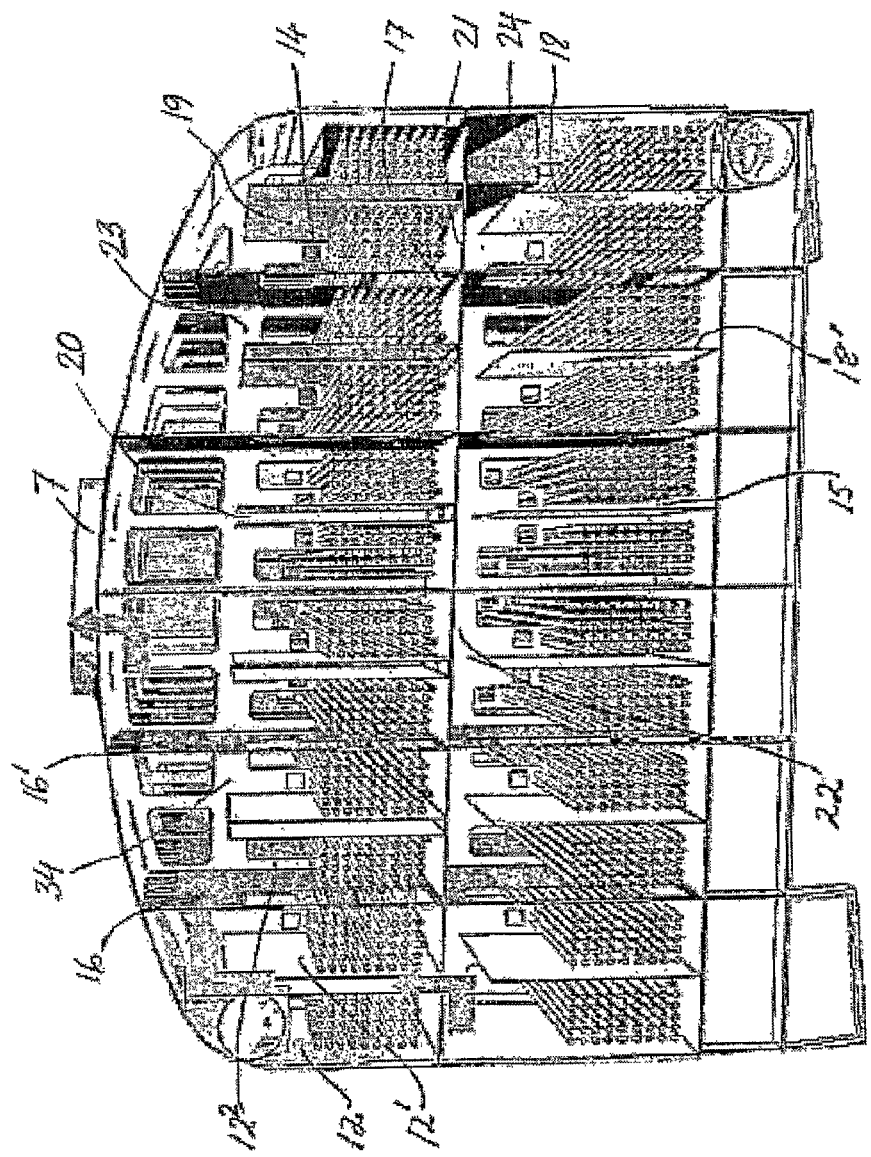
FIG. 3 shows another perspective of the drawing of FIG. 2.
Figure 4:
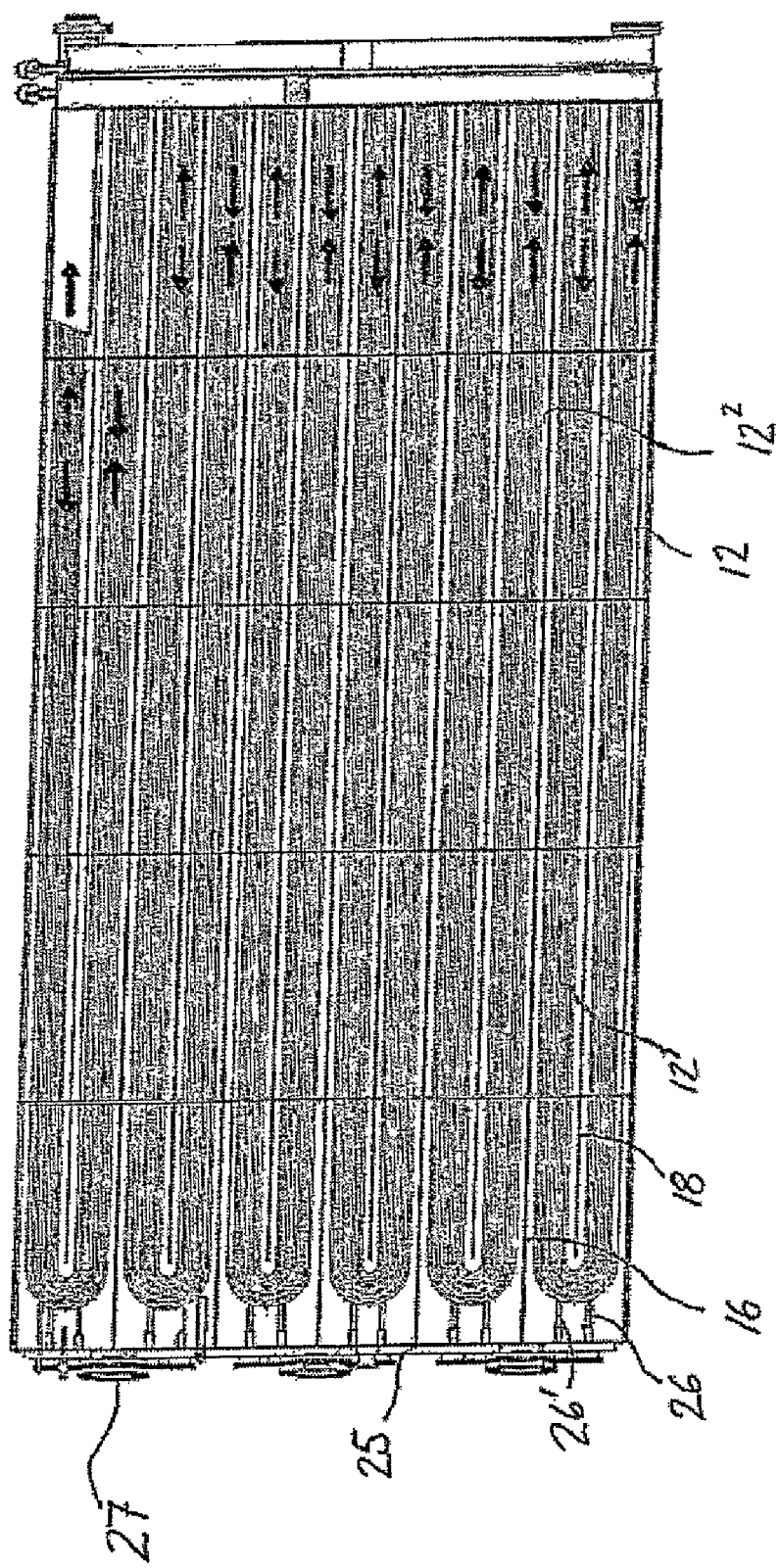
FIG. 4 shows a horizontal cross-section of the vacuum vessel and FIG. 5 shows the front side of the vacuum vessel and the groups of U-tubes.

The spaces for the oil 12, $12^1$, $12^2$ are shown more clearly in FIG. 3. There are longitudinal channel plates 16, $16^1$ separating spaces 12 and $12^1$ from spaces $12^2$ and the next space and so on. These channel plates extend from the first 2 to the second side of the vessel and are firmly connected to these sides. As may be seen in the drawing there are openings 17 for the oil in the channel plates 16, $16^1$ at the ends connected to the first side. In this drawing only the ends and parts of the group of U-tubes is to be seen. The arrangement and bends of the U-tubes are shown in FIG. 4. Between the legs of the U-tubes there are walls 18, $18^1$ firmly connected to the first side. As may be seen in FIG. 4 these walls end at a distance from the second side. The walls have such a height that the level of oil is well below the upper edge of the walls. The walls 18 in the lower layer 15 are single, while the walls 19 in the upper layer 14 are double forming a duct 20. The bottom 21 of the upper layer is provided with openings, which cooperate with the ducts 20 between the walls 19 to provide a connection between the volume 22 above the oil in the lower layer 15 and a volume 23 above the oil in the upper layer 14. The volume 23 is connected to the vacuum source. The grey arrows show the connection between the lowermost volume 22 and the vacuum connection 7.

As described earlier the oil to be treated enters through the inlet 3 and flows forwards and backwards until it reaches the last space in the upper layer, where there is an opening in the bottom 21 cooperating with an internal outlet 24. The way for transporting the oil to the lower layer of spaces will be explained later. The oil is transported to the uppermost space of the lower layer (to the left in the drawing) and flows forwards and backwards through the spaces until it reaches the outlet 4 for treated oil.

FIG. 4 shows how the groups of U-tubes are arranged in the spaces 12, $12^1$ and $12^2$. The spaces 12 and $12^2$ are separated by the channel plate 16, which channel plate is firmly connected to the first side 2 and the second side 25. Between the legs of the group of U-tubes in the lower deck there are walls 18 forcing the oil to flow to the second side 25 of the vessel before returning to the first side again.

In the drawing there are also shown the sparging pipes 26, $26^1$ and so on, for introducing stripping gas into the oil. Outside the vessel there are means to distribute the stripping gas to the sparging pipes. As may be seen on the drawing there are also sight-glasses 27 through which the sparging conditions may be supervised. The heating or cooling medium enters through the groups of U-tubes at the upper end of the drawing and flows in counter-current to the oil to be treated all through the spaces in the shown layer. The arrows show how the oil and the heating or cooling medium flow in counter-current. The arrows showing the oil flow is somewhat darker than the arrows showing the flow of heating or cooling medium.

Figure 5:
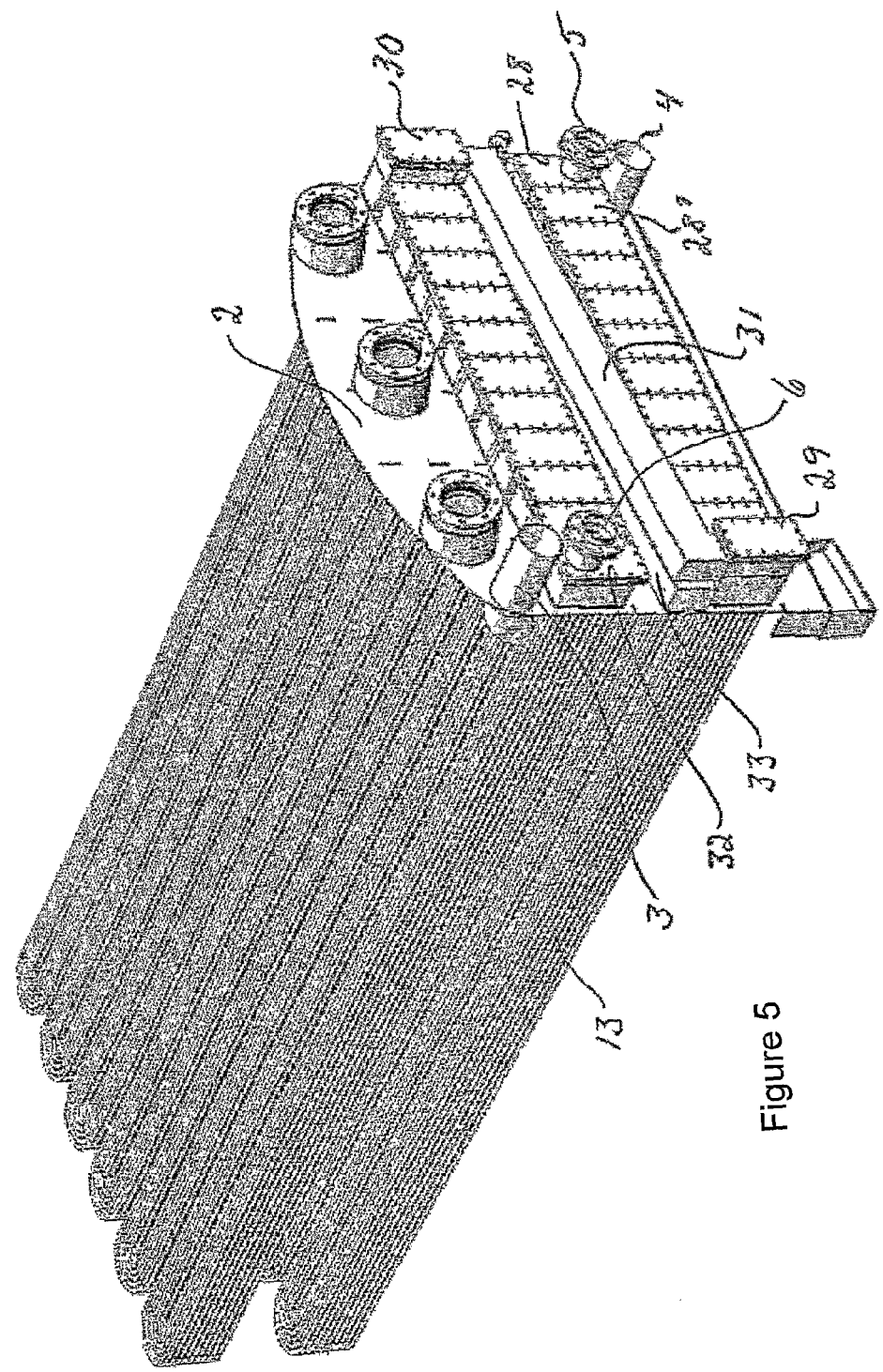

FIG. 5 shows the first side 2 of the vessel, the inlet 3 for the oil to be treated and the outlet 4 for the treated oil. There is also shown the inlet 5 for heating or cooling medium and the outlet 6 for the same. In the shown embodiment of the invention there are six groups of U-tubes in each layer. The heating or cooling medium enters one leg of an U-tube and returns through the other leg. In the shown embodiment there are five U-tubes in nine rows above each other. The heating or cooling medium enters the first header 28 and is distributed over and into the first leg of the forty-five tubes. When the heating or cooling medium has flown through the U-tubes it is collected in the second header $28^1$. There is a connection between the second header $28^1$ and a third header $28^2$ and the heating or cooling medium flows into the third header and is distributed into the second group of U-tubes. Also the heating or cooling medium flows forwards and backwards in the U-tubes until it reaches the last header 29 in the lower layer. Between this header 29 and another header 30 in the upper layer there is a channel 31 through which the heating or cooling medium may flow (be pumped) to the upper layer. The heating or cooling medium flows forwards and backwards within the U-tubes until it reaches the last header 32 in the upper layer. The heating or cooling medium leaves the vessel through the outlet 6.

As was mentioned earlier the oil to be treated is transported from the upper layer of spaces to the lower layer of spaces. This transport takes place by way of channel 33 situated inside of the channel 31.

The vacuum vessel may be self-supporting in that the channel plates 16, 161 and the baffles 34 (FIG. 4) cooperate.

What is claimed is:

1. A vacuum vessel for continuous or semi-continuous treatment of oils in connection with deodorization, said vessel comprising:

a plurality of groups of U-tubes for conveying a heating or cooling medium therethrough, each of said groups of U-tubes defining a first leg and a second leg, in fluid communication with one another, a plurality of pairs of first divider walls defining a space therebetween and in each of said spaces one of said groups of U-tubes is disposed, thereby separating each of said groups of U-tubes from one another;

a second divider wall disposed between each of said first leg and said second leg, said second divider wall cooperating with one of said first divider walls to define a first channel having one of said first legs disposed therein and cooperating with another one of said first divider walls to define a second channel having one of said second legs disposed therein, the first and second channels being in fluid communication with one another for flowing said oil therethrough, counter-current to a flow of said heating or cooling medium through said first and second legs;

perforated pipes arranged at the bottom of said spaces to lead stripping gas into said oil, which vessel has a connection to a vacuum source and which spaces in the vessel are arranged such that the oil passes through the vessel by gravity, and that a number of said groups of U-tubes are arranged substantially parallel and in rows above each other.

2. A vacuum vessel according to claim 1, wherein the vessel comprises at least one layer of said spaces for the oil to be treated in the vessel.

3. A vacuum vessel according to claim 1, wherein the vessel comprises an upper layer and lower layer of said spaces for the oil to be treated in the vessel and an inlet for the oil to an upper part of the upper layer in the vessel and an outlet for the oil from a lower part of the lower layer in the vessel and a channel connecting a lower part of the upper layer with a higher part of the lower layer.

4. A vacuum vessel according to claim 1, wherein lower part of the vessel has the form of a square-shaped or rectangular container and an upper part of the vessel is curved.

5. A vacuum vessel according to claim 1, wherein each of said first divider walls are connected to two sides of the vessel facing each other and are provided with openings in an end of each of said first divider walls for the oil to pass on to an adjacent one of said spaces.

6. A vacuum vessel according to claim 5, wherein each of said second divider walls are firmly connected to a first side and ending at a distance from a second side of the vessel.

7. A vacuum vessel according to claim 6, wherein there are headers outside said first side of the vessel, which headers define inlets to distribute the heating or cooling medium into the U-tubes and outlets to collect the heating or cooling medium after the passage through the U-tubes.

8. A vacuum vessel according to claim 7, wherein heating or cooling medium are distributed by the headers, where second and third headers as well as fourth and fifth headers and so on, counted from the inlet for heating or cooling medium are connected in order to make the heating or cooling medium flow through the groups of U-tubes in all spaces in the vessel.

9. A vacuum vessel according claim 3, wherein each of the second divider walls between the pairs of the first divider walls in the upper layer of spaces are hollow in order to create a connection between a volume above the oil in the lower layer of spaces and a volume above the oil in the upper layer, which upper volume is connected to the vacuum source.

10. A vacuum vessel according to claim 1, wherein the vessel comprises elements in the form of baffles and channel plates making the structure of the vessel self-supporting.

* * * * *